United States Patent
Milne et al.

(10) Patent No.: US 12,483,829 B2
(45) Date of Patent: Nov. 25, 2025

(54) AUDITORY DEVICE SOURCE DETECTION AND RESPONSE

(71) Applicant: Sony Group Corporation, Tokyo (JP)

(72) Inventors: James R. Milne, Romona, CA (US); Justin Kenefick, San Diego, CA (US); Wiliam Clay, San Diego, CA (US); Allison Burgueno, Oceanside, CA (US); Gregory Carlsson, Santee, CA (US)

(73) Assignee: SONY GROUP CORPORATION, Tokyo (JP)

( * ) Notice: Subject to any disclaimer, the term of this patent is extended or adjusted under 35 U.S.C. 154(b) by 232 days.

(21) Appl. No.: 18/212,003

(22) Filed: Jun. 20, 2023

(65) Prior Publication Data
US 2024/0430616 A1    Dec. 26, 2024

(51) Int. Cl.
*G10K 11/16* (2006.01)
*G06F 3/16* (2006.01)
*G10K 11/178* (2006.01)
*H04N 21/439* (2011.01)
*H04R 3/04* (2006.01)

(52) U.S. Cl.
CPC ............... *H04R 3/04* (2013.01); *G06F 3/165* (2013.01); *G10K 11/17823* (2018.01); *G10K 11/17873* (2018.01); *H04N 21/439* (2013.01); *G10K 2210/3027* (2013.01); *H04R 2420/07* (2013.01)

(58) Field of Classification Search
CPC .................. H04R 3/04; H04R 2420/07; G10K 11/17823; G10K 11/17873; G10K 2210/3027; G06F 3/165; H04N 21/439
USPC .............................................. 381/71.1, 71.12
See application file for complete search history.

(56) References Cited

U.S. PATENT DOCUMENTS

| | | |
|---|---|---|
| 10,595,135 B2 | 3/2020 | Li |
| 2015/0139468 A1 | 5/2015 | Feilner |
| 2015/0195641 A1* | 7/2015 | Di Censo ............. H04R 1/1083 381/71.6 |
| 2021/0014610 A1 | 1/2021 | Carrigan |

* cited by examiner

Primary Examiner — Ammar T Hamid
(74) Attorney, Agent, or Firm — Trellis IP Law Group, PC (57) ABSTRACT

A computer-implemented method performed on a user device includes wirelessly connecting a user device to an auditory device. The method further includes determining a type of auditory device wirelessly connected to the user device. The method further includes determining a type of action being performed by the user device. The method further includes transmitting an instruction to the auditory device to apply a first preset based on the type of auditory device and the type of action.

20 Claims, 9 Drawing Sheets

AUDITORY DEVICE SOURCE DETECTION AND RESPONSE

BACKGROUND

People listen to different types of audio streams that are transmitted from user devices to auditory devices. For example, users may listen to music, watch television, make phone calls, etc. The settings for playing audio available for modification on the user device may be annoying to configure and involve many different windows.

SUMMARY

In some embodiments, a computer-implemented method performed on a user device includes wirelessly connecting a user device to an auditory device. The method further includes determining a type of auditory device wirelessly connected to the user device. The method further includes determining a type of action being performed by the user device. The method further includes transmitting an instruction to the auditory device to apply a first preset based on the type of auditory device and the type of action.

In some embodiments, the first preset is a phone call preset that applies a speech preset curve and noise cancellation or adaptive noise cancellation to sounds detected by the auditory device. In some embodiments, the first preset is a streaming audio preset that applies a music preset curve to sounds detected by the auditory device. In some embodiments, the first preset is a streaming video preset that applies a video preset curve to sounds detected by the auditory device. In some embodiments, the type of action is a first type of action and the method further includes determining a second type of action being performed by the user device, wherein the second type of action is different from the first type of action and transmitting an instruction to the auditory device to apply a second preset based on the type of auditory device and the second type of action. In some embodiments, the method further includes generating graphical data for displaying a user interface that includes an option for a user to select one or more words that are associated with a second preset, wherein determining that the user spoke the one or more words results the auditory device applying the second preset. In some embodiments, the type of auditory device is at least one auditory device selected from the group of a hearing aid, earbuds, headphones, and a speaker.

In some embodiments, an auditory device includes one or more processors and logic encoded in one or more non-transitory media for execution by the one or more processors and when executed are operable to: wirelessly connect to a user device, transmit information to the user device that identifies a type of the auditory device wirelessly connected to the user device, query the user device about a type of action being performed by the user device, and apply a first preset based on the type of auditory device and the type of action.

In some embodiments, the logic is further operable to detect a user speaking, determine an auditory command based on the user speaking, and apply a second preset based on the auditory command. In some embodiments, the logic is further operable to detect a hand gesture or a tap made by a user, determine a command corresponding to the hand gesture or the tap, and apply a second preset based on the command. In some embodiments, the first preset is a phone call preset that applies a speech preset curve and noise cancellation or adaptive noise cancellation to sounds detected by the auditory device. In some embodiments, the first preset is a streaming audio preset that applies a music preset curve to sounds detected by the auditory device. In some embodiments, the first preset is a streaming video preset that applies a video preset curve to sounds detected by the auditory device. In some embodiments, the type of action is a first type of action and the logic is further operable to query the user device about the type of action being performed by the user device and apply a second preset based on the type of auditory device and the type of action, wherein the second preset is different from the first preset. In some embodiments, the type of auditory device is at least one auditory device selected from the group of a hearing aid, earbuds, headphones, and a speaker.

In some embodiments, software is encoded in one or more computer-readable media for execution by the one or more processors and when executed is operable to: wirelessly connect a user device to an auditory device, determine a type of auditory device wirelessly connected to the user device, determine a type of action being performed by the user device, and transmit an instruction to the auditory device to apply a first preset based on the type of auditory device and the type of action.

In some embodiments, the first preset is a phone call preset that applies a speech preset curve and noise cancellation or adaptive noise cancellation to sounds detected by the auditory device. In some embodiments, the first preset is a streaming audio preset that applies a music preset curve to sounds detected by the auditory device. In some embodiments, the preset is a streaming video preset that applies a video preset curve to sounds detected by the auditory device. In some embodiments, the type of action is a first type of action and the software is further operable to determine a second type of action being performed by the user device and transmit an instruction to the auditory device to apply a second preset based on the type of auditory device and the second type of action.

The technology advantageously automatically determines an appropriate preset to apply to audio based on a type of device and a type of action. As a result, a user can avoid the cumbersome process of having to navigate through settings in a user interface each time that the user wants to change the preset.

A further understanding of the nature and the advantages of particular embodiments disclosed herein may be realized by reference of the remaining portions of the specification and the attached drawings.

DETAILED DESCRIPTION OF EMBODIMENTS

Example Environment 100

Figure 1:
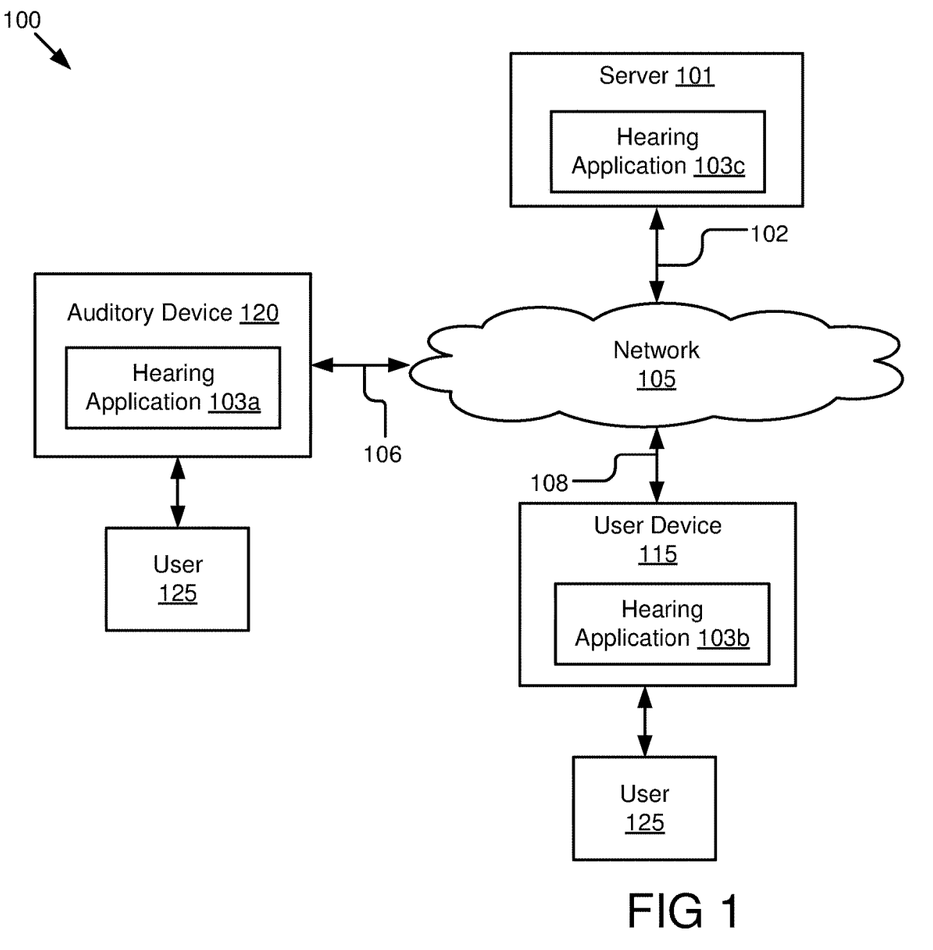
FIG. 1 is a block diagram of an example network environment according to some embodiments described herein.

FIG. 1 illustrates a block diagram of an example environment 100. In some embodiments, the environment 100 includes an auditory device 120, a user device 115, and a server 101. A user 125 may be associated with the user device 115 and the auditory device 120. In some embodiments, the environment 100 may include other servers or devices not shown in FIG. 1. In FIG. 1 and the remaining figures, a letter after a reference number, e.g., "103a," represents a reference to the element having that particular reference number (e.g., a hearing application 103a stored on the user device 115). A reference number in the text without a following letter, e.g., "103," represents a general reference to embodiments of the element bearing that reference number (e.g., any hearing application).

The auditory device 120 may include a processor, a memory, a speaker, and network communication hardware. The auditory device 120 may be a hearing aid, earbuds, headphones, or a speaker device. The speaker device may include a standalone speaker, such as a soundbar or a speaker that is part of a device, such as a speaker in a laptop, tablet, phone, etc.

The auditory device 120 is communicatively coupled to the network 105 via signal line 106. Signal line 106 may be a wired connection, such as Ethernet, coaxial cable, fiber-optic cable, etc., or a wireless connection, such as Wi-Fi®, Bluetooth®, or other wireless technology.

In some embodiments, the auditory device 120 includes a hearing application 103a that performs hearing tests. For example, the user 125 may be asked to identify sounds emitted by speakers of the auditory device 120 and the user may provide user input, for example, by pressing a button on the auditory device 120, such as when the auditory device is a hearing aid, earbuds, or headphones. In some embodiments where the auditory device 120 is larger, such as when the auditory device 120 is a speaker device, the auditory device 120 may include a display screen that receives touch input from the user 125.

In some embodiments, the auditory device 120 communicates with a hearing application 103b stored on the user device 115. During testing, the auditory device 120 receives instructions from the user device 115 to emit test sounds at particular decibel levels. Once testing is complete, the auditory device 120 receives a hearing profile that includes instructions for how to modify sound based on different factors, such as frequencies, types of sounds, one or more presets, etc. The auditory device 120 may also receive instructions from the user device 115 to emit different combinations of sounds in relation to determining user preferences that memorialized as one or more presets.

The user device 115 may be a computing device that includes a memory, a hardware processor, and a hearing application 103b. The user device 115 may include a mobile device, a tablet computer, a laptop, a desktop computer, a mobile telephone, a wearable device, a head-mounted display, a mobile email device, or another electronic device capable of accessing a network 105 to communicate with one or more of the server 101 and the auditory device 120.

In the illustrated implementation, user device 115 is coupled to the network 105 via signal line 108. Signal line 108 may be a wired connection, such as Ethernet, coaxial cable, fiber-optic cable, etc., or a wireless connection, such as Wi-Fi®, Bluetooth®, or other wireless technology. The user device 115 is used by way of example. While FIG. 1 illustrates one user device 115, the disclosure applies to a system architecture having one or more user devices 115.

In some embodiments, the hearing application 103b includes code and routines operable to connect with the auditory device 120 to receive a signal, such as by making a connection via Bluetooth® or Wi-Fi®; implementing a hearing test; determining one or more presents that correspond to a user preference; and transmit the hearing profile and the one or more presets to the auditory device 120.

The server 101 may include a processor, a memory, and network communication hardware. In some embodiments, the server 101 is a hardware server. The server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the server includes a hearing application 103c. In some embodiments and with user consent, the hearing application 103c on the server 101 maintains a copy of the hearing profile and the one or more presets. In some embodiments, the server 101 maintains audiometric profiles generated by an audiologist for different situations, such as an audiometric profile of a person with no hearing loss, an audiometric profile of a man with no hearing loss, an audiometric profile of a woman with hearing loss, etc.

The hearing application 103a may work by pulling information from the user device 115 or pushing information to the user device 115. For example, in some embodiments, the hearing application 103a on the auditory device 120 maintains a wireless connection with the user device 115 and queries the user device 115 about a type of action that is performed by the user device 115. For example, the action may include that the user 125 is on a phone call, listening to music, or streaming a video. The hearing application 103a applies a preset based on the type of auditory device 120 and the type of action being performed by the user device 115. For example, if the user 125 is on a phone call, the preset may include a speech preset curve and noise cancellation or adaptive noise cancellation.

In another example, in some embodiments, the hearing application 103b on the user device 115 determines a type of auditory device wirelessly connected to the user device 115 and a type of action being performed by the user device. The hearing application 103b transmits an instruction to the auditory device to apply a preset based on the type of auditory device and the type of action.

Figure 2:
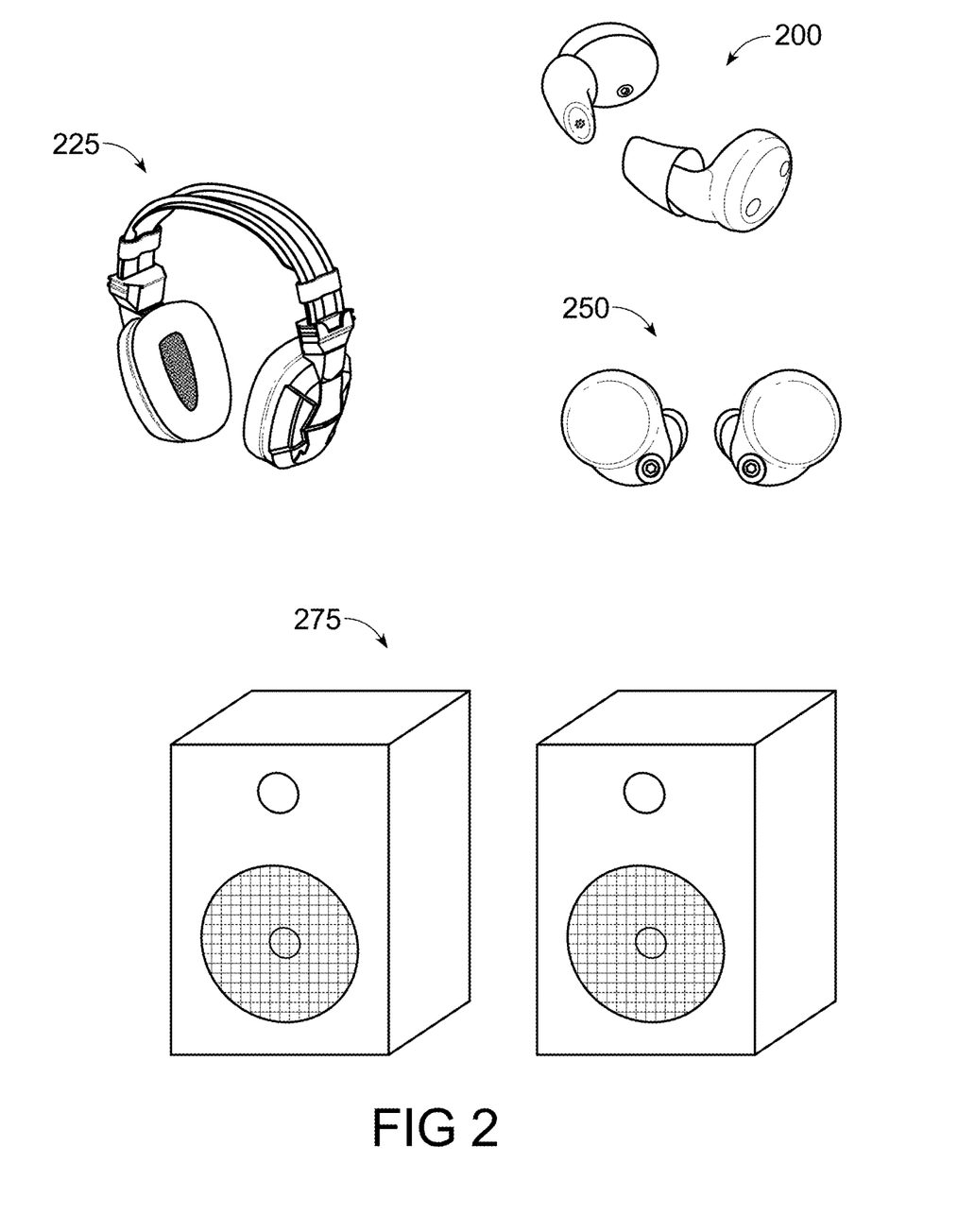
FIG. 2 is an illustration of example auditory devices according to some embodiments described herein.

FIG. 2 illustrates example auditory devices. Specifically, FIG. 2 illustrates a hearing aid 200, headphones 225, earbuds 250, and a speaker device 275. In some embodiments, each of the auditory devices is operable to receive instructions from the hearing application 103 to produce sounds that are used to test a user's hearing and modify sounds produced by the auditory device based on a hearing profile.

Example Auditory Device 300

Figure 3:
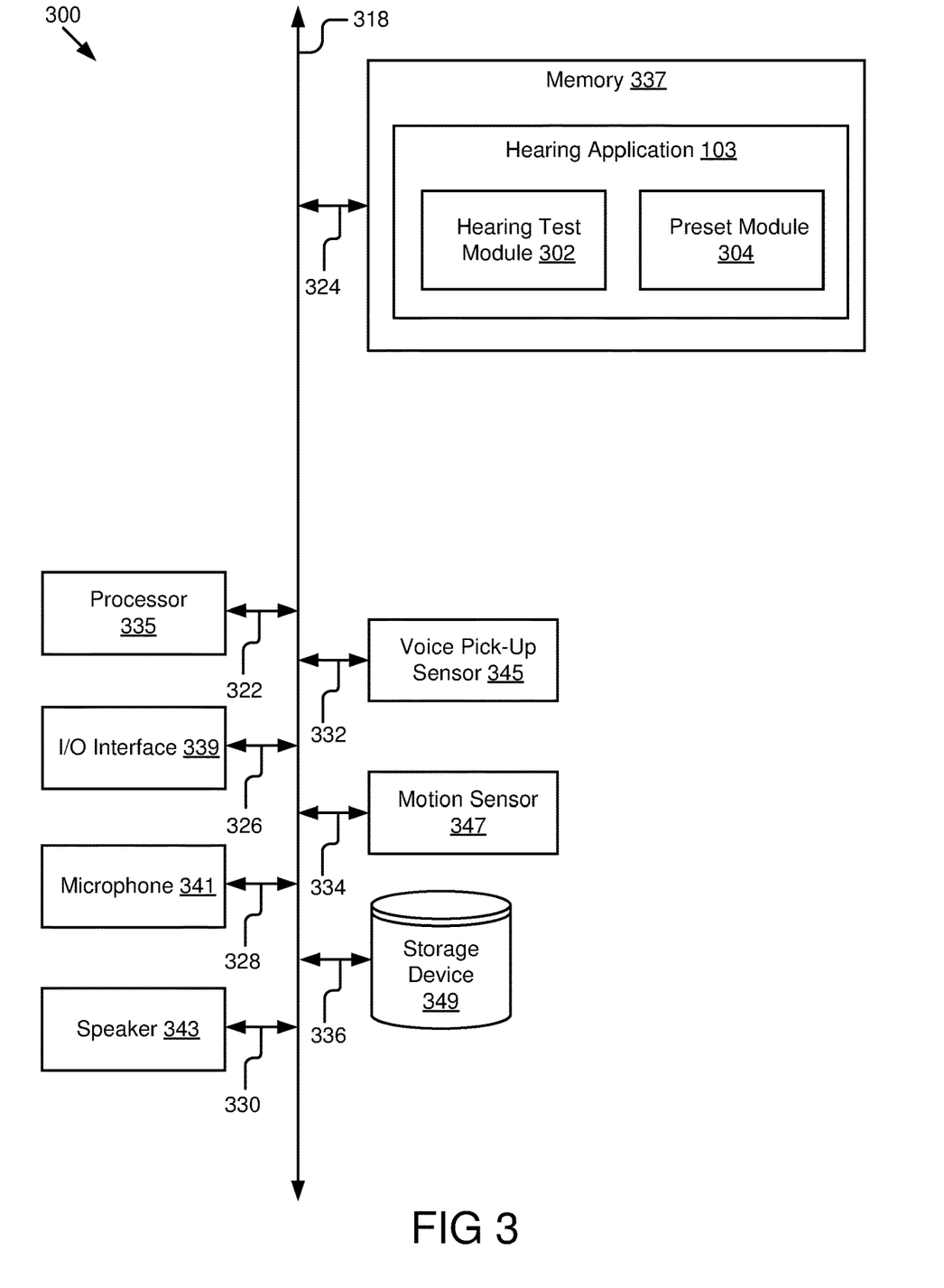
FIG. 3 is a block diagram of an example auditory device according to some embodiments described herein.

FIG. 3 is a block diagram of an example auditory device 300 that may be used to implement one or more features described herein. The auditory device 300 can be any suitable computer system or other electronic or hardware device.

In some embodiments, auditory device 300 includes a processor 335, a memory 337, an Input/Output (I/O) interface 339, a microphone 341, a speaker 343, a voice pick-up sensor 345, a motion sensor 347, and a storage device 349. The processor 335 may be coupled to a bus 318 via signal line 322, the memory 337 may be coupled to the bus 318 via signal line 324, the I/O interface 339 may be coupled to the bus 318 via signal line 326, the microphone 341 may be coupled to the bus 318 via signal line 328, the speaker 343 may be coupled to the bus 318 via signal line 328, the voice pick-up sensor 345 may be coupled to the bus 318 via signal line 332, the motion sensor 347 may be coupled to the bus 318 via signal line 334, and the storage device 349 may be coupled to the bus 318 via signal line 336.

The processor 335 can be one or more processors and/or processing circuits to execute program code and control basic operations of the auditory device 300. A processor includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, or other systems. A computer may be any processor in communication with a memory.

The memory 337 is typically provided in auditory device 300 for access by the processor 335 and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 335 and/or integrated therewith. Memory 337 can store software operating on the auditory device 300 by the processor 335, including the hearing application 103.

The I/O interface 339 can provide functions to enable interfacing the auditory device 300 with other systems and devices. Interfaced devices can be included as part of the auditory device 300 or can be separate and communicate with the auditory device 300. For example, network communication devices, storage devices (e.g., the memory 337 or the storage device 349), and input/output devices can communicate via I/O interface 339.

In some embodiments, the I/O interface 339 handles communication between the auditory device 300 and the user device via a wireless protocol, such as Bluetooth, Wi-Fi, or Near Field Communication (NFC). In some embodiments, the I/O interface 339 provides information to the user device that identifies a type of the auditory device 300 that is wirelessly connected to the user device.

The microphone 341 includes hardware for detecting sounds. For example, the microphone 341 may detect ambient noises, people speaking, music, etc. The microphone 341 converts the detected sounds to an electrical signal that is transmitted to the speaker 343 via the I/O interface 339.

The speaker 343 includes hardware for receiving the electrical signal from the microphone 341 and converts the electrical signal into sound waves that are output for the user to hear. For example, the speaker 343 may include a digital to analog converter that converts the electrical signal to sound waves. In some embodiments, the speaker 343 also includes an amplifier that is used to amplify, reduce, or block certain sounds based on a particular setting. For example, the amplifier may block ambient noise when a noise cancelling setting is activated.

The voice pick-up sensor 345 may include hardware for detecting jaw vibrations due to speech. The voice pick-up sensor 345 relies on bone conduction to detect jaw vibrations created by speaking.

The motion sensor 347 includes hardware for detecting a gesture or a tap from the user. In some embodiments, the motion sensor is a proximity sensor that identifies particular gestures made by the user's hand that are associated with particular instructions. In some embodiments, the motion sensor detects when the user makes contact with the auditory device 300. For example, the user may tap the auditory device 300 or press a button on the auditory device 300.

The storage device 349 stores data related to the hearing application 103. For example, the storage device 349 may store hearing profiles generated by the hearing application 103, sets of test sounds, a hearing profile, and one or more presets.

Although particular components of the auditory device 300 are illustrated, other components may be added or removed.

Example Hearing Application 103

In some embodiments, the hearing application 103 includes a hearing test module 302 and a preset module 304.

The hearing test module 302 conducts a hearing test by instructing the speaker 343 to emit sounds. In some embodiments, the hearing test is administered by a user marking in a user interface displayed on the user device whether the user heard a particular sound. Once testing is completed, the hearing test module 302 may receive the hearing profile from the user device.

In some embodiments, the preset module 304 receives one or more presets from the user device. In some embodiments, the preset module 304 conducts preset tests to determine user preferences related to the presets. For example, the preset module 304 may instruct the speaker 343 to emit sounds associated with different user preferences and the user may provide user input via the user interface displayed on the user device.

In some embodiments, the preset module 304 assigns one or more default presets. The one or more default presets may be based on the most common presets used by users associated with a particular type of auditory device 300. In some embodiments, the one or more default presets may be based on the most common presets used by users of a particular demographic (e.g., based on sex, age, similarity of user profiles, etc.). The preset module 304 may implement testing to determine user preferences that correspond to the one or more presets or the preset module 304 may update the one or more default presets in response to receiving feedback from the user.

Figure 4A:
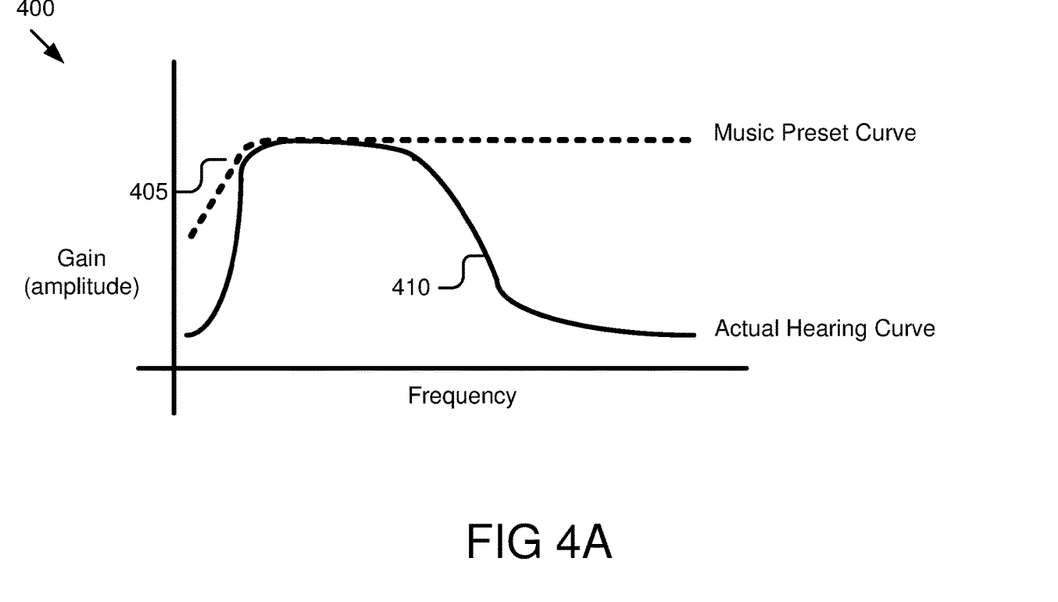
FIG. 4A is an illustration of an example graph of a music preset curve as compared to an actual hearing curve according to some embodiments described herein.

In some embodiments, the preset includes a preset curve that adds gain (amplitude) to certain frequencies based on the type of preset curve. For example, FIG. 4A is an illustration of an example graph 400 of a music preset curve 405 as compared to an actual hearing curve 410. When a user listens to music, the user wants to hear the full range of music. As a result, the preset module 304 applies a gain at the lowest frequency, stays about the same in the middle, and adds gain from the middle to the end of the frequencies. The music preset curve 405 results in the user being able to hear all the frequencies better by increasing the loudness of certain frequencies where the user might otherwise have difficulty hearing.

Figure 4B:
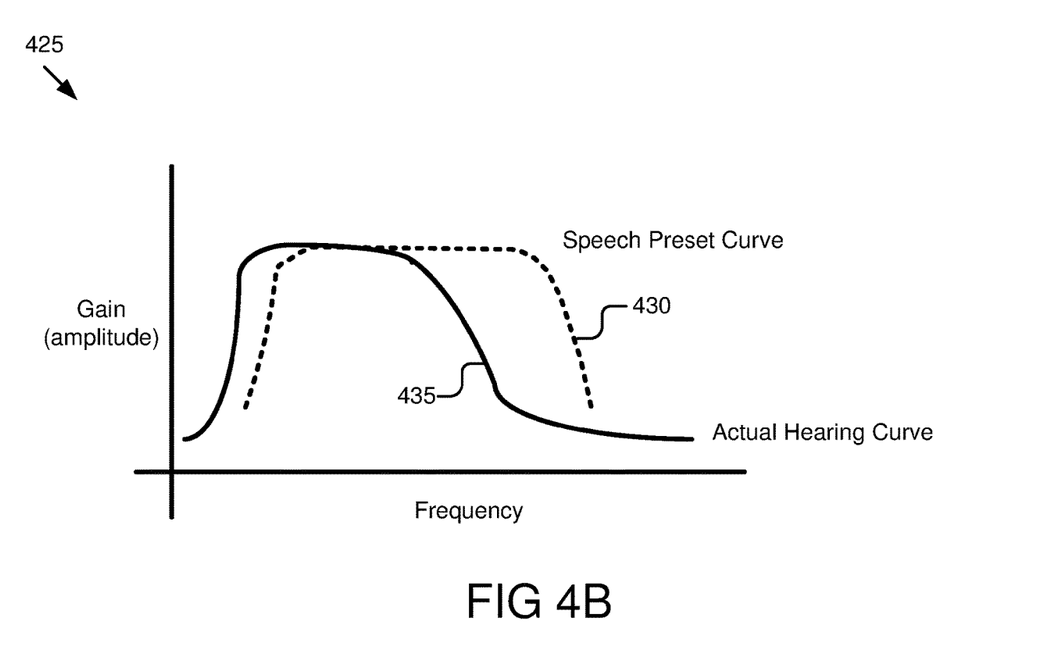
FIG. 4B is an illustration of an example graph of a speech preset curve as compared to an actual hearing curve according to some embodiments described herein.

FIG. 4B is an illustration of an example graph 425 of a speech preset curve 530 as compared to an actual hearing curve 435. When a user is listening to speech, the gain is limited to a shorter frequency range because speech is typically 80 to 300 Hertz. As a result, although users can hear frequencies below 80 Hertz, the speech preset curve does not apply gain until the threshold of frequencies that apply to human speech.

The preset module 304 determines one or more presets that correspond to a user preference. For example, the presets include a noise cancellation preset, an ambient noise preset, a speech and music preset, a music in a room preset, a voice in a crowded room preset, a type of enclosure, a type of speech, a type of music, a type of noise, a type and model of auditory device, and/or a type of auditory condition.

The noise cancellation preset removes external noise from the auditory device 300. For example, the auditory device 300 may include a microphone 341 that detects sounds and speakers 343 that emit signals that cancel out the noise frequencies to cancel out both sets of sounds when the soundwaves from the noise and the signals collide. In some embodiments, the preset module 304 determines that the user prefers the noise cancellation preset and, as a result, the noise cancellation preset is automatically used. In some embodiments, the noise cancellation preset is applied to particular situations. For example, the preset module 304 may determine that the user wants the noise cancellation preset to be activated when the user has a telephone call, but not when the user is listening to music.

The ambient noise preset causes the auditory device to provide a user with surrounding outside noises while also playing other sounds, such as music, a movie, etc. The auditory device may include a microphone 341 that detect the outside noises and provide the outside noises to the user with speakers 343. In some embodiments, the preset module 304 determines that the user prefers the ambient noise preset and, as a result, the ambient noise preset is automatically used. In some embodiments, the ambient noise preset is applied to particular situations. For example, the preset module 304 may determine that the user wants the ambient noise preset to be activated when the user is watching movies on a user device.

In some embodiments, the preset module 304 generates a noise cancellation and ambient noise preset that may cause the auditory device to provide a user with noise cancellation of noises that are not directly surrounding the user while allowing in sounds that directly surround the user through the ambient noise aspect of the preset. In some examples, the noise cancellation and ambient noise preset includes three options: a first setting activates the ambient noise function and the noise cancellation function, a second setting turns off the noise-cancellation function so only the ambient noise function is active, and a third setting turns off the ambient noise function so only the noise cancellation function is activated.

In yet another example, the preset module 304 may determine that a user prefers equalizer settings to be activated. Equalizers are software or hardware filters that adjust the loudness of specific frequencies. Equalizers work in bands, such as treble bands and bass bands, which can be increased or decreased. As a result of applying equalizer settings, the user may hear all frequencies with the same perceived loudness based on adjusting the decibel levels based on the music testing.

In some embodiments, the preset module 304 includes a machine-learning model to determine the one or more presets. The training data may be labelled with one or more presets corresponding to users with different demographics (e.g., sex, age, auditory conditions, etc.). The preset module 304 may train the machine-learning model using supervised training data to receive a hearing profile as input and output the one or more presets.

In some embodiments, the preset module 304 receives feedback from a user. The user may provide user input to a user interface that changes one or more presets. For example, the user may change a preset for streaming audio to include noise cancellation. The preset module 304 updates the one or more presets based on the feedback. In some embodiments, the preset module 304 does not change the one or more presets until a threshold amount of feedback has been received. For example, the preset module 304 may not change a preset until the user has changed the preset a threshold of four times (or three, five, etc.).

The preset module 304 applies a preset. In some embodiments, the preset module 304 determines a preset based on a type of auditory device 300 and a type of action being performed by the user device. The preset module 304 may query the user device about the type of action being performed by the user device. For example, the preset module 304 may detect a change in the type of information received from the user device (e.g., from streaming music to detecting the user speaking). In another example, the preset module 304 may periodically query the user device about the type of action being performed (e.g., every five seconds, every 30 second, etc.). In some embodiments, the preset module 304 receives information about the type of action being performed by the user device without having to query the user device. For example, the preset module 304 may determine that the user changed from streaming music to conducting a phone call based on the type of information being received from the user device.

In some embodiments, a phone call preset includes applying a speech preset curve and a noise cancellation or adaptive noise cancellation to sounds detected by the microphone 341 of the auditory device 300. In some embodiments, a streaming audio preset includes applying a music preset curve to sounds detected by the microphone 341 of the auditory device 300. In some embodiments, a streaming video preset includes applying a speech preset curve to sounds detected by the microphone 341 of the auditory device 300. The streaming video may be further divided based on the type of streaming video. For example, if a user is watching a news report, the preset module 304 may apply a streaming speech/news preset curve that prioritizes speech. In another example, if the streaming video is a movie, the preset module 304 may apply a streaming movie preset that provides surround sound audio.

In some embodiments, a user may change from a first preset to a second preset. In some embodiments, the preset module 304 queries the user device about the type of action being performed by the user device and applies the second preset based on the type of auditory device and the type of action. For example, the voice pick-up sensor 345 may detect that the user is speaking, such as if the user said "apply the music preset." The preset module 304 may determine an auditory command based on the user speaking and apply the second preset based on the auditory command. The command may be configured via a user interface, as discussed in greater detail below.

In another example, the user may change from the first preset to the second preset based on movement detected by the motion sensor 347. For example, the motion sensor 347 may detect a hand gesture or a tap from the user that indicates that the user wants to change presets. The user may include a particular hand motion or simply a sequence of hand movements into and out of the proximity of the motion sensor 347 within a predetermined amount of time (e.g., three movements within proximity of the motion sensor 347 within five seconds). Alternatively, the user may make a certain number of taps to change the preset. For example, one tap may signify changing from a first preset to a second, a long tap may indicate staying on a particular preset, etc. In some embodiments, the user may specify commands associated with each tap by providing user input in the user interface.

The motion sensor 347 may transmit the details of the gesture or tap to the preset module 304, which determines a command corresponding to the hand gesture or tap.

Figure 5:
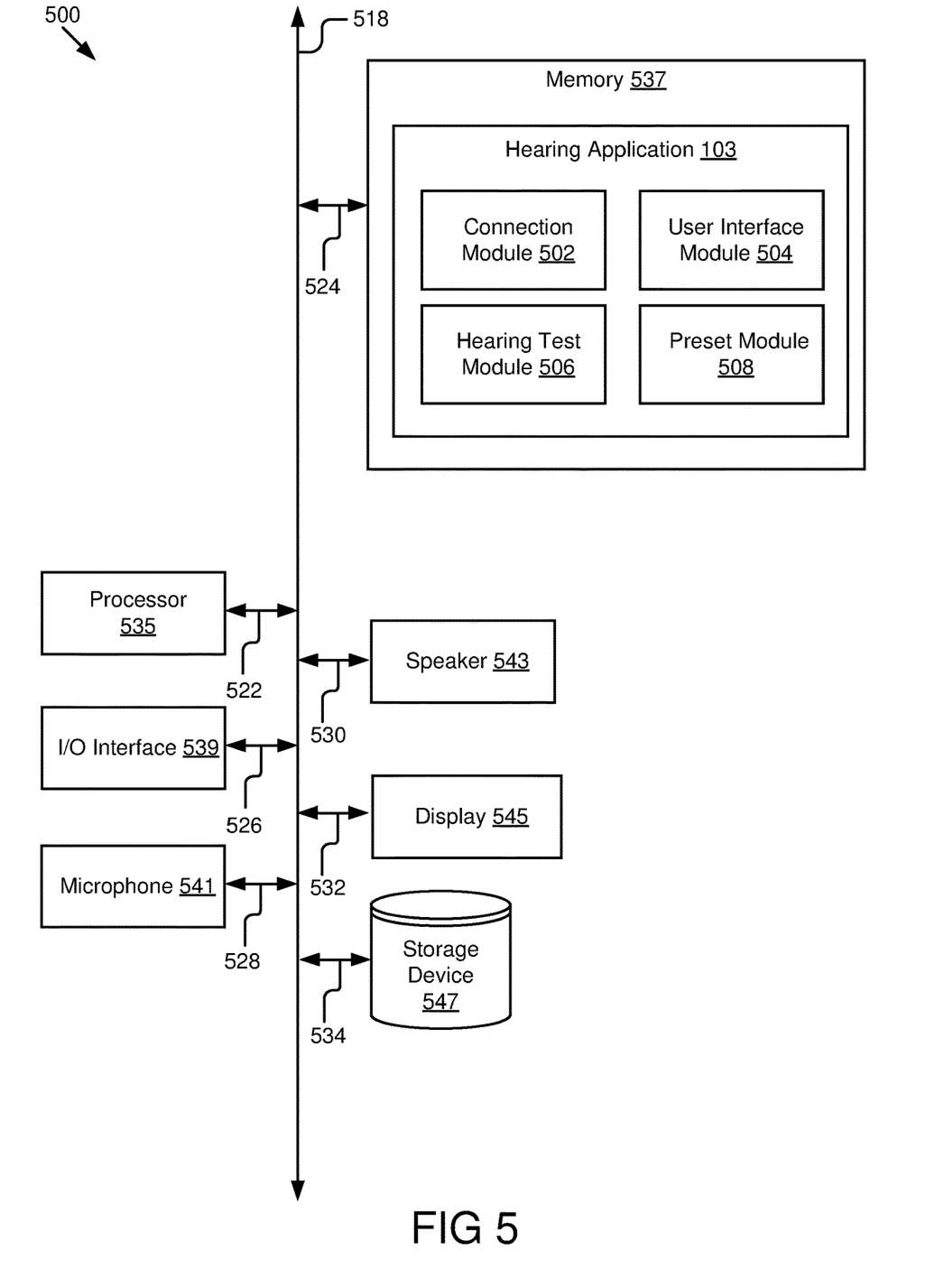
FIG. 5 is a block diagram of an example user device according to some embodiments described herein.

FIG. 5 is a block diagram of an example user device 500. In some embodiments, user device 500 includes a processor 535, a memory 537, an Input/Output (I/O) interface 539, a microphone 541, a speaker 543, a display 545, and a storage device 547. The processor 535 may be coupled to a bus 518 via signal line 522, the memory 537 may be coupled to the bus 518 via signal line 524, the I/O interface 539 may be coupled to the bus 518 via signal line 526, the microphone 541 may be coupled to the bus 518 via signal line 528, the speaker 543 may be coupled to the bus 518 via signal line 528, the display 545 may be coupled to the bus 518 via signal line 532, and the storage device 547 may be coupled to the bus 518 via signal line 534.

Many of the components including the processor 535, the memory 537, the I/O Interface 539, the microphone 541, and the speaker 543 are similar to the memory 337, the processor 335, the I/O interface 339, the microphone 341, the speaker 343, and the storage device 547 described above with reference to FIG. 3, and so, their descriptions are not repeated below.

The display 545 may connect to the I/O interface 539 to display content, e.g., a user interface, and to receive touch (or gesture) input from a user. The display 545 can include any suitable display device such as a liquid crystal display (LCD), light emitting diode (LED), or plasma display screen, television, monitor, touchscreen, or other visual display device.

The memory 537 includes a hearing application 103 that includes a connection module 502, a user interface module 504, a hearing test module 506, and a preset module 508.

The connection module 502 scans for broadcast identifiers and identifies user devices that are within a communication range of the auditory device 300. For example, the wireless protocol may include Bluetooth, Wi-Fi, NFC, etc.

In some embodiments, the connection module 502 provides information about the broadcast identifiers to the user interface module 504. The user interface module 504 may display the list of broadcast identifiers that are available. In some embodiments, a user requests to make a connection with a particular auditory device through the user interface for the first time that the connection module 502 makes the connection and then the devices automatically connect thereafter.

Once the connection module 502 determines that the user requests to connect with an auditory device, the connection module 502 transmits a request to connect via the I/O interface 539 to the second auditory device. The connection may be a Bluetooth connection, a Wi-Fi connection, an NFC connection, a proprietary connection produced by the manufacturer of the auditory device, or another type of wireless connection.

The connection module 502 determines if an acknowledgement is received from the auditory device. If the acknowledgement is not received (e.g., if the acknowledgement is not received within a predetermined amount of time), the connection module 502 may halt the connection and go back to scanning for broadcast identifiers. If the connection module 502 receives the acknowledgement, the connection module 502 may subscribe to the connection. In some embodiments, the connection module 502 maintains an encrypted connection.

The connection module 502 determines whether to store the connection. For example, the user interface module 306 may generate graphical data for displaying a user interface that asks the user if they want to store the connection. The connection module 502 either stores the connection and starts the communication or, if the connection is not being stored, starts the communication. The connection module 502 may maintain the connection until the user is done (e.g., the user indicates that the connection should be stopped) or the auditory device is out of range.

The user interface module 504 generates a user interface. In some embodiments, a user downloads the hearing application 103 onto a user device 500. The user interface module 504 may generate graphical data for displaying a user interface where the user provides input that the hearing test module 506 uses to generate a hearing profile for a user. For example, the user may provide a username and password, input their name, and provide an identification of an auditory device (e.g., identify whether the auditory device is a hearing aid, headphones, earbuds, or a speaker device).

In some embodiments, the user interface includes an option for specifying a particular type of auditory device and a particular model that is used during testing. For example, the hearing aids may be Sony C10 self-fitting over-the-counter hearing aids (model CRE-C10) or E10 self-fitting over-the-counter hearing aids (model CRE-E10). The identification of the type of auditory device is used for, among other things, determining a beginning decibel level for the test sounds. For example, because hearing aids, earbuds, and headphones are so close to the ear (and are possibly positioned inside the ear), the beginning decibel level for a hearing aid is 0 decibels. For testing of a speaker device, the speaker device should be placed a certain distance from the user and the beginning decibel level may be modified according to that distance. For example, for a speaker device that is within 5 inches of the user, the beginning decibel level may be 10 decibels.

In some embodiments, once the user has selected a type of auditory device, the user interface module 504 generates a user interface for specifying a model of the auditory device. For example, the user interface module 504 may generate graphical data for displaying a list of different types of Sony headphones. For example, the list may include WH-1000XM4 wireless Sony headphones, WH-CH710N wireless Sony headphones, MDR-ZX110 wired Sony headphones, etc. Other Sony headphones may be selected. In some embodiments, the user interface module 504 may generate graphical data to display a list of models from other manufacturers.

The user interface module 504 generates graphical data for displaying a user interface that allows a user to select a hearing test. For example, the hearing test module 506 may implement pink noise band testing, speech testing, and music testing. In some embodiments, the user may select which type of test is performed first. In some embodiments, before testing begins the user interface includes an instruction for the user to move to an indoor area that is quiet and relatively free of background noise.

In some embodiments, the user interface module 504 generates graphical data for displaying a user interface to select a number of listening bands for the hearing testing. For example, the user interface may include radio buttons for selecting a particular number of listening bands or a field where the user may enter a number of listening bands.

Once the different tests begin, in some embodiments, the user interface module 504 generates graphical data for displaying a user interface with a way for the user to identify when the user hears a sound. For example, the user interface may include a button that the user can select when the user hears a sound. In some embodiments, the user interface displayed during speech testing includes a request to identify a particular word from a list of words. For example, the user interface may include radio buttons where the words are, bar, and star, and a request for the user to identify which of the words they heard from the auditory device (along with options for not hearing any speech or not being able to determine the identity of the word). This helps identify words or sound combinations that the user may have difficulty hearing.

In some embodiments, the user interface module 504 may generate graphical data for displaying a user interface that allows a user to repeat the hearing tests. For example, the user may feel that the results are inaccurate and may want to test their hearing to see if there has been an instance of hearing loss that was not identified during testing. In another example, a user may experience a change to their hearing conditions that warrant a new test, such as a recent infection that may have caused additional hearing loss.

In some embodiments, the user interface module 504 generates graphical data for displaying a user interface for determining user preferences for generating one or more presets, the specifics of which will be described in greater detail below with reference to the preset module 508. In some embodiments, the user preferences are determined after the hearing tests are completed. For example, after pink band testing is completed, the user interface module 504 may generate a user interface with questions about whether the user prefers the use of a noise cancellation preset or an ambient noise preset.

In yet another example, after the speech test is completed, the user interface module 504 may generate a user interface with questions about speech preferences, such as whether the user prefers using a speech preset curve.

In another example, after the music test is completed, the user interface module 504 may generate a user interface with questions about music preferences, such as whether the user prefers an equalizer preset, ambient sounds, etc. In some embodiments, after the music test is completed, the user interface module 504 may generate a user interface with questions about speech and music preferences that is used by the preset module 508 to determine a speech preset and a music preset.

Other user interfaces may be used to determine the one or more presets. For example, instead of using a slider to change the types of noises, the user interface module 504 may generate a user interface that cycles through different situations and the user interface includes a slider for changing the decibel level or there may be no slider and instead the user preferences are determined with radio buttons, icons, vocal responses from the user, etc.

In some embodiments, the user interface module 504 generates graphical data for a user interface that includes icons for different presets that allows the user to modify the one or more presets. For example, the user interface may include an icon and associated text for a noise cancellation preset, an ambient noise preset, a speech and music preset, a type of noise preset, and a type of auditory condition. The type of noise preset may include individual icons for presets corresponding to each type of noise, such as one for construction noise and another for noises at a particular frequency. The type of auditory condition preset may include individual icons for presets corresponding to each type of auditory condition, such as an icon for tinnitus and an icon for phonophobia.

Figure 6:
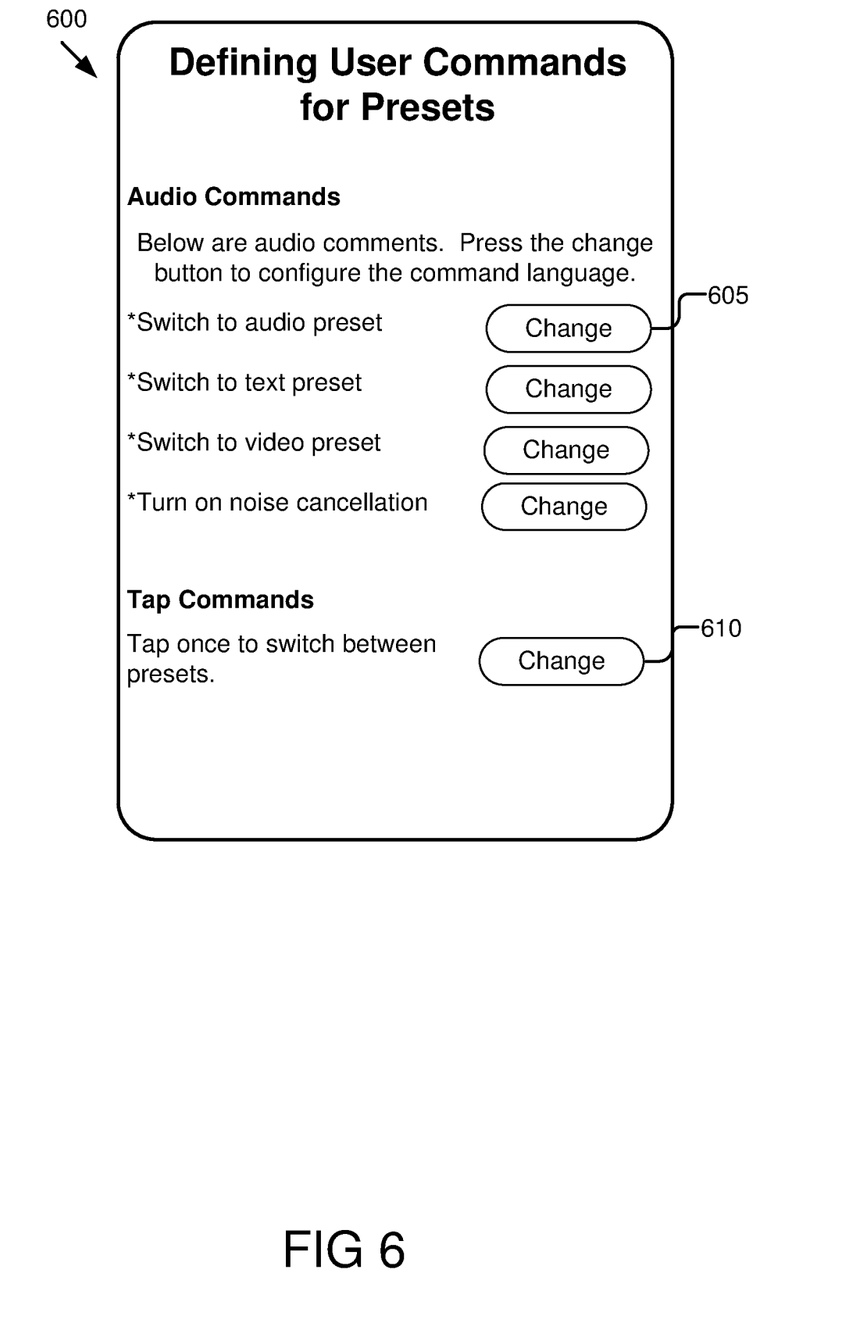
FIG. 6 is an example user interface for specifying a user command for selecting a preset according to some embodiments described herein.

In some embodiments, the user interface module 504 may generate a user interface for configuring different commands. Turning to FIG. 6, an example user interface for specifying audio commands, hand gestures, and presets for selecting a preset are illustrated. Although FIG. 6 includes options for two types of commands, the user interface may include one or more options for configuring audio commands, tap commands, and gesture commands.

In FIG. 6, the user interface module 504 generates a list of audio commands associated with particular actions. Each option is associated with a change button so that the user can configure the language. For example, the user may click change button 605 to change the language "switch to audio preset" to be any other language. FIG. 6 also includes a tap commands section where a single tap command is currently associated with instructions to switch between presets. The user may select the change button 610 to change the tap command. For example, the user could change the tap command to be two taps to switch between presets.

In some embodiments, the user interface module 504 generates graphical data for displaying a user interface that includes an option to override the one or more presets. For example, continuing with the example above, the user interface may include icons for different presets and selecting a particular preset causes the user interface to display information about the particular preset. For example, selecting the ambient noise preset may cause the user interface to show that the ambient noise preset is automatically on. The user may provide feedback, such as turning off the ambient noise preset so that it is automatically off. The preset module 508 may update the one or more presets based on the feedback from the user.

The hearing test module 506 generates a hearing profile after receiving user input provided via the user interface. For example, the hearing test module 506 instructs the auditory device to play a sound at a particular decibel, receives user input via the user input when the user can hear the sound, and generates a hearing profile that indicates a frequency at which the user can hear the sound. The hearing test module 506 may use multiple types of tests. For example, the hearing test module 506 may implement pink band testing that determines the decibels at which pink bands are audible to users. The hearing test module 506 may also implement speech testing to determine circumstances when speech is most audible to the user and music testing to determine circumstances when music is most audible to the user.

In some embodiments, the hearing test module 506 modifies the hearing profile to include instructions for producing sounds based on a corresponding frequency according to a Fletcher Munson curve. The Fletcher Munson curve identifies a phenomenon of human hearing where as an actual loudness changes, the perceived loudness that a human's brain hears will change at a different rate, depending on the frequency. For example, at low listening volumes mid-range frequencies sound more prominent, while the low and high frequency ranges seem to fall into the background. At high listening volumes the lows and highs sound more prominent, while the mid-range seems comparatively softer.

In some embodiments, the hearing test module 506 receives an audiometric profile from the server and compares the hearing profile to the audiometric profile in order to make recommendations for the user. In some embodiments, the hearing test module 506 modifies the hearing profile to include instructions for producing sounds based on a comparison of the hearing profile to the audiometric profile. For example, the hearing test module 506 may identify that there is a 10-decibel hearing loss at 400 Hertz based on comparing the hearing profile to the audiometric profile and the hearing profile is updated with instructions to produce sounds by increasing the auditory device by 10 decibels for any noises that occur at 400 Hertz.

In some embodiments, the preset module 508 conducts preset tests to determine user preferences related to the presets. The preset module 304 may instruct the auditory device to emit sounds associated with different user preferences and the user may provide user input via the user interface that includes approval or disapproval of different presets. The difference types of presets are described above with reference to the auditory device and will not be repeated here.

In some embodiments, the preset module 508 determines a type of auditory device wirelessly connected to the user device 500. For example, the type of auditory device may be established as part of the connection process handled by the connection module 502. The preset module 508 may generate different presets based on the type of auditory device. For example, a user may not need a noise cancellation preset with over-the-ear headphones that are better at blocking noises than other types of auditory devices.

The preset module 508 determines a type of action being performed by the user device. For example, the preset module 508 may determine whether the user is taking a phone call, listening to music, watching a news broadcast, watching a movie, etc. In some embodiments, the preset module 508 transmits an instruction to the auditory device to apply a first preset based on the type of auditory device and the type of action. In some embodiments, the preset module 508 provides information about the type of action being performed to the auditory device so that the auditory device can determine a type of preset to apply.

In some embodiments, the preset module 508 may determine a second type of action being performed by the user device. For example, the preset module 508 may determine that the user switched from watching a movie to taking a telephone call. The preset module 508 may transmit an instruction to the auditory device to apply a second preset based on the type of auditory device and the second type of action.

Example Methods

Figure 7:
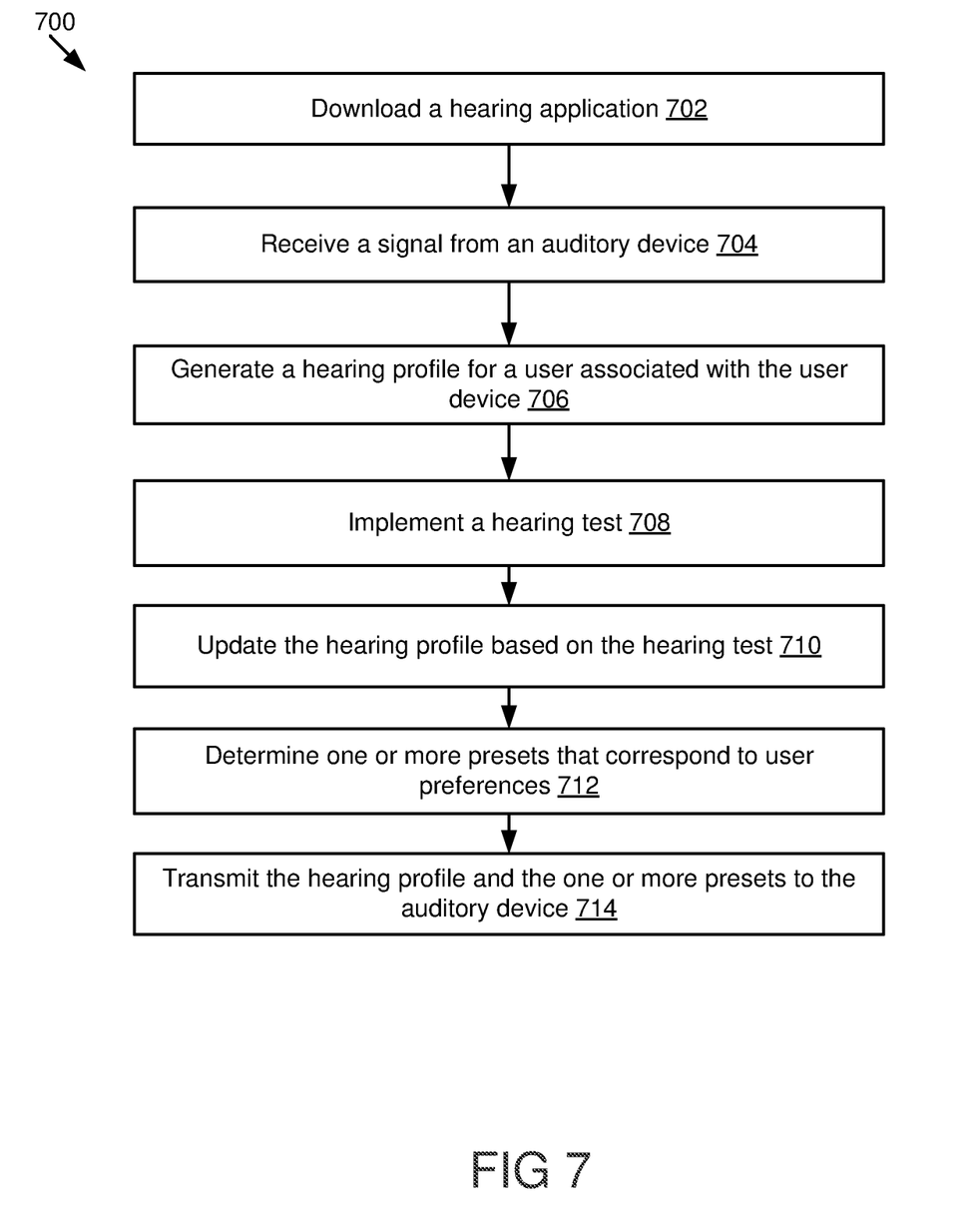
FIG. 7 illustrates a flowchart of an example method to generate a hearing profile and one or more presets according to some embodiments described herein.

FIG. 7 illustrates a flowchart of an example method 700 to generate a hearing profile and one or more presets. The method 700 may be performed by the auditory device 300 in FIG. 3 or the user device 500 in FIG. 5. The auditory device 300 or the user device 500 includes a hearing application 103 that implements the steps described below.

In embodiments where the method 700 is performed by the user device 500, the method 700 may start with block 702. At block 702, a hearing application is downloaded. In embodiments where the method 700 is performed by the auditory device 120, the method may start with block 706. Block 702 may be followed by block 704.

At block 704, a signal is received from an auditory device. For example, the signal may be for establishing a Bluetooth connection with a user device. Block 704 may be followed by block 706.

At block 706, a hearing profile is generated for a user associated with the user device. Block 706 may be followed by block 708.

At block 708, a hearing test is implemented. The hearing test may include pink noise band testing, a music test, a speech test, or any other type of hearing test. Block 708 may be followed by block 710.

At block 710, the hearing profile is updated based on the hearing test. The hearing profile may be stored locally on the user device 500 or the auditory device 300 and/or on the server 101 in FIG. 1. Block 710 may be followed by block 712.

At block 712, one or more presets are determined that correspond to user preferences. For example, a user interface may be generated with questions about difference user preferences for sounds at particular frequencies, types of sounds, types of speech, types of situations where noise interferes with hearing voices, etc. If the method 700 is performed by the auditory device, the method may end here. If the method is performed by the user device, block 712 may be followed by block 714.

At block 714, the hearing profile and the one or more presets are transmitted to the auditory device.

Figure 8:
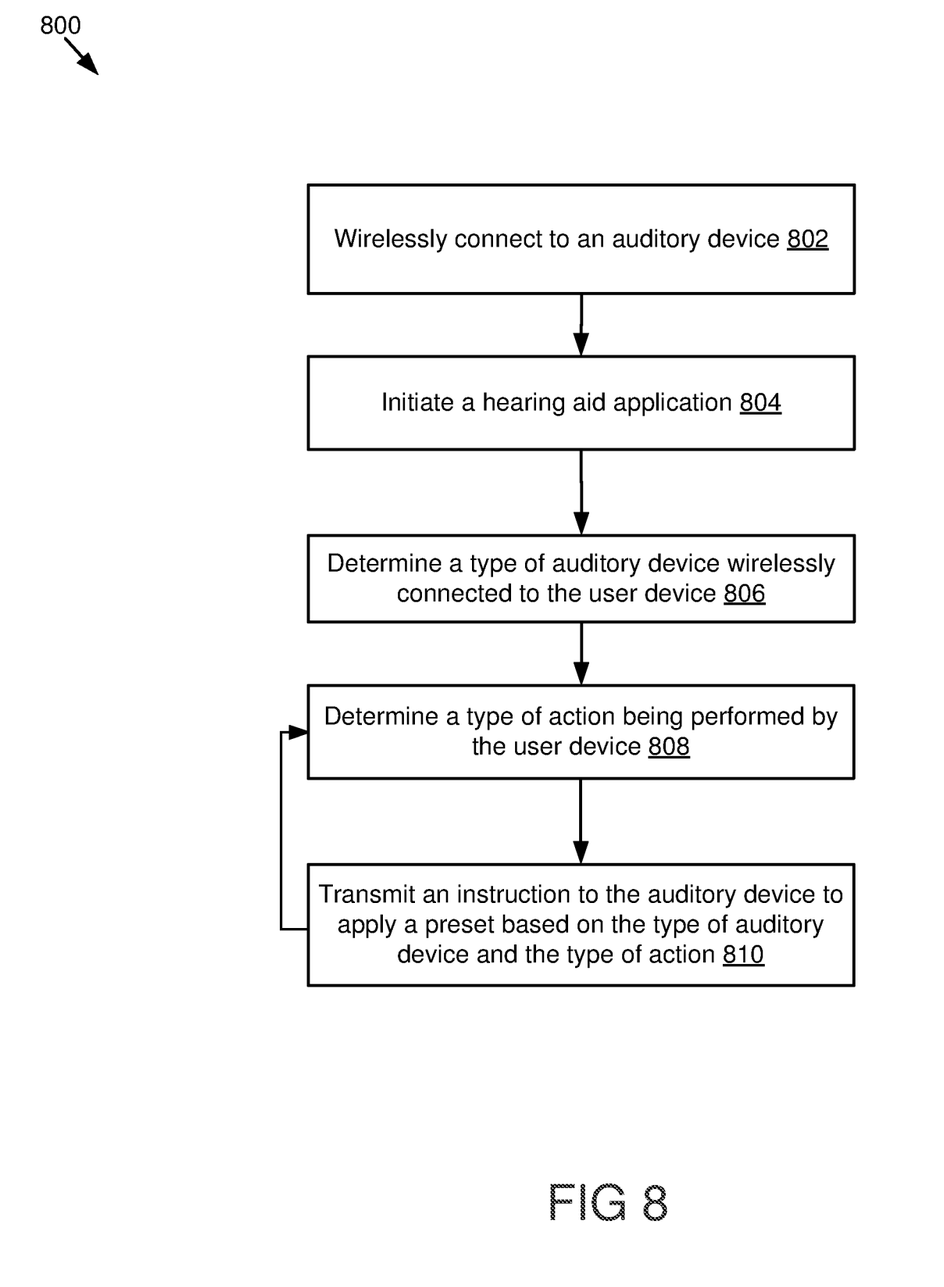
FIG. 8 illustrates a flowchart of an example method performed on a user device to transmit an instruction to an auditory device to apply a preset according to some embodiments described herein.

FIG. 8 illustrates a flowchart of an example method 800 performed on a user device to transmit an instruction to an auditory device to apply a preset. The method 800 may be performed by the user device 500 in FIG. 5.

The method 800 may begin with block 802. At block 802, the user device wirelessly connects to an auditory device. For example, the wireless connection may be Bluetooth, Wi-Fi, NFC, etc. Block 802 may be followed by block 804.

At block 804, a hearing aid application is initiated. For example, a user may select the hearing aid application for use. Block 804 may be followed by block 806.

At block 806, a type of auditory device wirelessly connected to the user device is determined. For example, the auditory device may be a hearing aid, earbuds, headphones, or a speaker. Block 806 may be followed by block 808.

At block 808, a type of action being performed by the user device is determined. For example, the type of action may include taking a phone call, listening to music, or watching a video. Block 808 may be followed by block 810.

At block 810, an instruction is transmitted to the auditory device to apply a preset based on the type of auditory device and the type of action. Block 810 may be followed by block 808 and the process may be completed until the hearing application is no longer being used. For example, the user may switch from taking a phone call to watching a video and, as a result, an instruction is transmitted to the auditory device to apply a different preset based on changing the type of activity.

Figure 9:
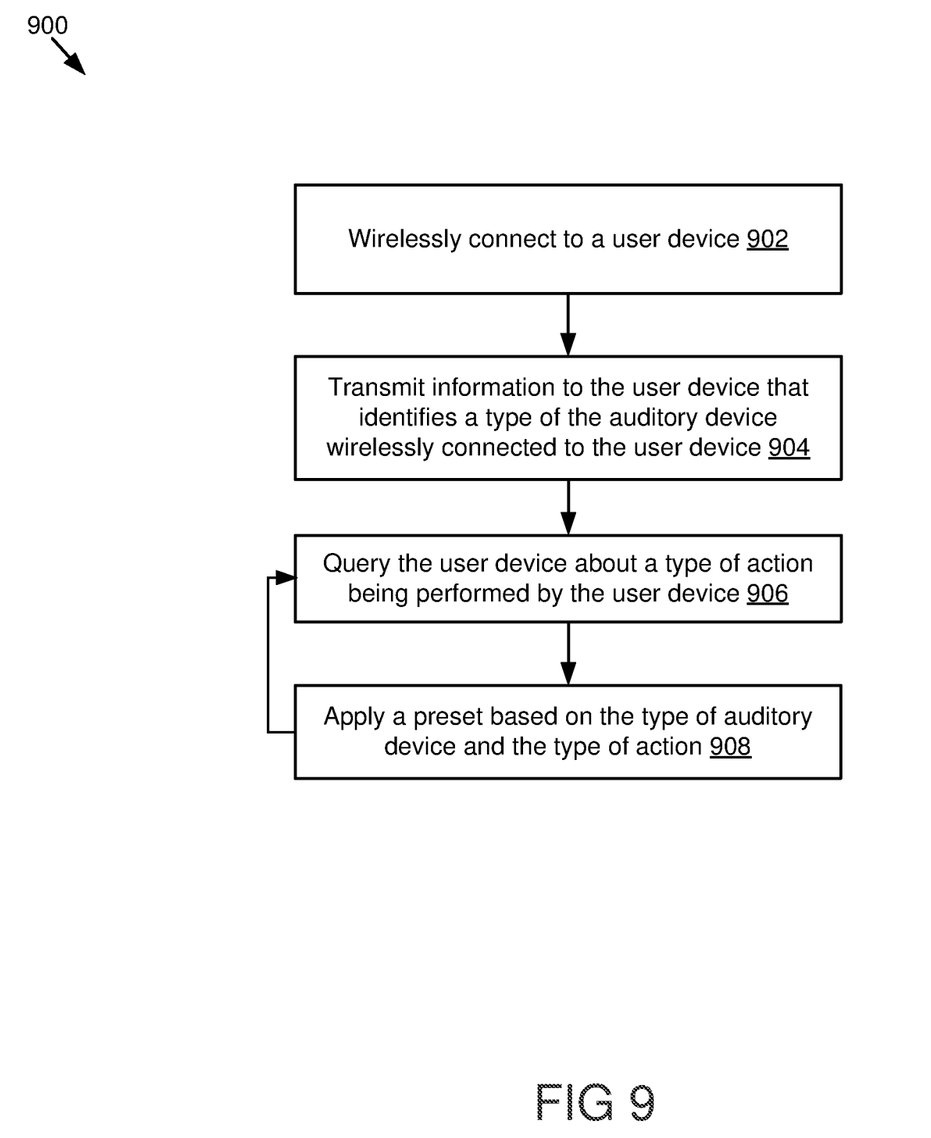
FIG. 9 illustrates a flowchart of an example method performed on an auditory device to apply a preset according to some embodiments described herein.

FIG. 9 illustrates a flowchart of an example method 900 performed on an auditory device to apply a preset. The method 900 may be performed by the auditory device 300 in FIG. 3.

The method 900 may begin with block 902. At block 902, the auditory device wirelessly connects to a user device. For example, the wireless connection may be Bluetooth, Wi-Fi, NFC, etc. Block 902 may be followed by block 904.

At block 904, information is transmitted to the user device that identifies a type of the auditory device wirelessly connected to the user device. Block 904 may be followed by block 906.

At block 906, the user device is queries about a type of action being performed by the user device. The query may be sent periodically or in response to detecting a change in the type of information being streamed from the user device. Block 906 may be followed by block 908.

At block 908, a preset is applied based on the type of auditory device and the type of action. Block 908 may be followed by block 906 and continued until the user ceases using the auditory device.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer-implemented method performed on a user device, the method comprising:
    wirelessly connecting a user device to an auditory device;
    determining a type of auditory device wirelessly connected to the user device;
    determining a type of action being performed by the user device; and
    transmitting an instruction to the auditory device to apply a first preset based on the type of auditory device and the type of action.

2. The method of claim 1, wherein the first preset is a phone call preset that applies a speech preset curve and noise cancellation or adaptive noise cancellation to sounds detected by the auditory device.

3. The method of claim 1, wherein the first preset is a streaming audio preset that applies a music preset curve to sounds detected by the auditory device.

4. The method of claim 1, wherein the first preset is a streaming video preset that applies a video preset curve to sounds detected by the auditory device.

5. The method of claim 1, wherein the type of action is a first type of action and further comprising:
    determining a second type of action being performed by the user device, wherein the second type of action is different from the first type of action; and
    transmitting an instruction to the auditory device to apply a second preset based on the type of auditory device and the second type of action.

6. The method of claim 1, further comprising:
    generating graphical data for displaying a user interface that includes an option for a user to select one or more words that are associated with a second preset, wherein determining that the user spoke the one or more words results the auditory device applying the second preset.

7. The method of claim 1, wherein the type of auditory device is at least one auditory device selected from the group of a hearing aid, earbuds, headphones, and a speaker.

8. An auditory device comprising:
    one or more processors; and
    logic encoded in one or more non-transitory media for execution by the one or more processors and when executed are operable to:

wirelessly connect to a user device;
transmit information to the user device that identifies a type of the auditory device wirelessly connected to the user device;
query the user device about a type of action being performed by the user device; and
apply a first preset based on the type of auditory device and the type of action.

9. The auditory device of claim 8, wherein the logic is further operable to:
detect a user speaking;
determine an auditory command based on the user speaking; and
apply a second preset based on the auditory command.

10. The auditory device of claim 8, wherein the logic is further operable to:
detect a hand gesture or a tap made by a user;
determine a command corresponding to the hand gesture or the tap; and
apply a second preset based on the command.

11. The auditory device of claim 8, wherein the first preset is a phone call preset that applies a speech preset curve and noise cancellation or adaptive noise cancellation to sounds detected by the auditory device.

12. The auditory device of claim 8, wherein the first preset is a streaming audio preset that applies a music preset curve to sounds detected by the auditory device.

13. The auditory device of claim 8, wherein the first preset is a streaming video preset that applies a video preset curve to sounds detected by the auditory device.

14. The auditory device of claim 8, wherein the type of action is a first type of action and the logic is further operable to:
query the user device about the type of action being performed by the user device; and
apply a second preset based on the type of auditory device and the type of action, wherein the second preset is different from the first preset.

15. The auditory device of claim 8, wherein the type of auditory device is at least one auditory device selected from the group of a hearing aid, earbuds, headphones, and a speaker.

16. Software encoded in one or more non-transitory computer-readable media for execution by the one or more processors and when executed is operable to:
wirelessly connect a user device to an auditory device;
determine a type of auditory device wirelessly connected to the user device;
determine a type of action being performed by the user device; and
transmit an instruction to the auditory device to apply a first preset based on the type of auditory device and the type of action.

17. The software of claim 16, wherein the first preset is a phone call preset that applies a speech preset curve and noise cancellation or adaptive noise cancellation to sounds detected by the auditory device.

18. The software of claim 16, wherein the first preset is a streaming audio preset that applies a music preset curve to sounds detected by the auditory device.

19. The software of claim 16, wherein the preset is a streaming video preset that applies a video preset curve to sounds detected by the auditory device.

20. The software of claim 16, wherein the type of action is a first type of action and the software is further operable to:
determine a second type of action being performed by the user device; and
transmit an instruction to the auditory device to apply a second preset based on the type of auditory device and the second type of action.

* * * * *